United States Patent [19]

DeGuchi

[11] Patent Number: 5,175,482

[45] Date of Patent: Dec. 29, 1992

[54] STEPPING MOTOR CONTROL CIRCUIT

[75] Inventor: Koji DeGuchi, Tokyo, Japan

[73] Assignee: NEC Corporation, Tokyo, Japan

[21] Appl. No.: 777,643

[22] Filed: Oct. 16, 1991

[30] Foreign Application Priority Data

Oct. 17, 1990 [JP] Japan .................. 2-278262

[51] Int. Cl.$^5$ .............................................. H02P 8/00
[52] U.S. Cl. .................................................. 318/696
[58] Field of Search ........................................ 318/696

[56] References Cited

U.S. PATENT DOCUMENTS

4,803,415  2/1989  Sepesy ............................ 318/696
5,001,410  3/1991  Ono ................................ 318/696

Primary Examiner—William M. Shoop, Jr.
Assistant Examiner—Karen Masih
Attorney, Agent, or Firm—Laff, Whitesel, Conte & Saret

[57] ABSTRACT

A stepping motor control circuit (50) has a step circuit (51) and a track circuit (52). The track circuit has an up-down counter (1) including an offset circuit (11), and a decoder (2). The offset circuit speeds up the change over from the first digit to the second digit in an up-down counter, when a two-phase excitation system is selected for the stepping motor. The speed-up is by a half period, or so, in terms of the output of the first digit in the up-counting mode or down-counting mode. Therefore, in either of the up-counting or down-counting modes, the excitation output starts to change at the first clock pulse input after the counting direction has been changed. Thus, the operation speed of the control circuit can be improved. Also, the information on the completion of the track operation can be immediately sent to a host device.

3 Claims, 10 Drawing Sheets

STEPPING MOTOR CONTROL CIRCUIT

BACKGROUND OF THE INVENTION

(1) Field of the Invention

The present invention relates to a stepping motor control circuit, and more particularly to a stepping motor control circuit which can set a two-phase excitation system and one-two phase excitation system or two-one phase excitation system, and also which can provide the stepping motor with the same operating timing in its both normal and reverse operation in the state in which the two-phase excitation system is set.

(2) Description of the Related Art

Referring to FIGS. 1 to 3A and 3B, an explanation will be given on the conventional stepping motor control circuit.

Figure 1:
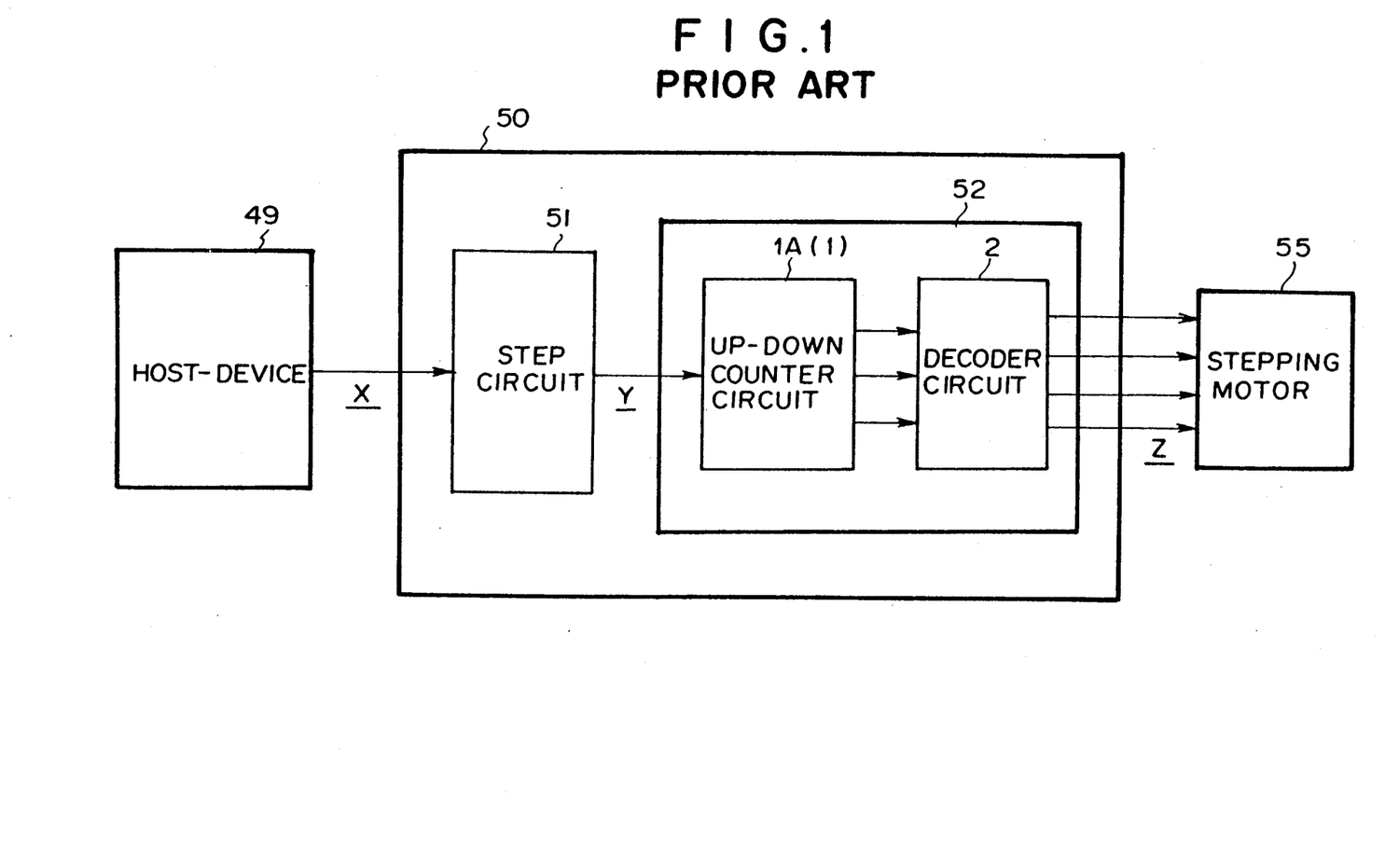
FIG. 1 is a block diagram of an example of the conventional stepping motor control circuits.

FIG. 1 is a block diagram showing an arrangement of the conventional stepping motor control circuit.

As seen from FIG. 1, a stepping motor control circuit 50 for driving a head included in a floppy disk drive (FDD) or a hard disk drive (HDD) is composed of a step circuit 51 and a track circuit 52 for converting the stepping pulse signal sent from a host device (computer) 49 into a suitable signal. The excitation outputs thus obtained by the stepping motor control circuit 50 is used to control a stepping motor 55. The step circuit 51 in the control circuit 50 converts a stepping pulse signal X from the host computer 49 into a pulse train Y of a plurality of pulses which are to be sent to the following track circuit 52. The track circuit 52 is composed of an up-down counter circuit 1A for counting the pulse train and a decoder circuit 2 for decoding the counter output. The stepping motor 55 is excited on the basis of the decoded output Z.

A number of excitation methods for such a stepping motor have been proposed. Here, with respect to a four-phase stepping motor, as an example, an explanation will be given on the track circuit 52 capable of setting a two-phase excitation system and a one-two phase excitation system or two-one phase excitation system.

Figure 2:
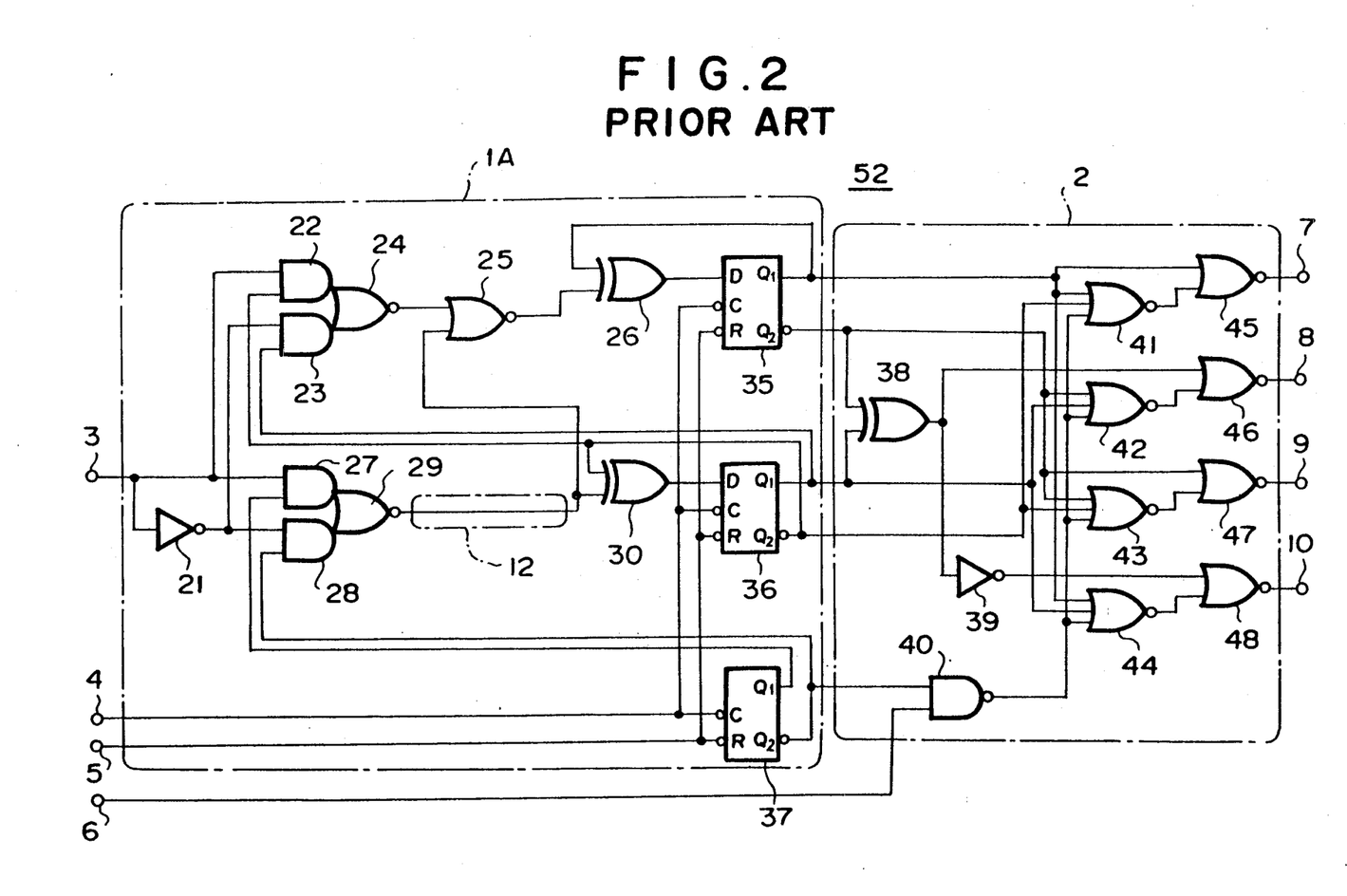
FIG. 2 is a circuit diagram of the track circuit included in the stepping motor control circuit shown in FIG. 1.

FIG. 2 is a detailed circuit diagram of the conventional track circuit 52 of FIG. 1. As seen from FIG. 2, the conventional track circuit 52 comprises the up-down counter circuit 1A and the decoder circuit 2. Specifically, the up-down counter 1A is composed of two-input AND gates 22, 23 and 27, 28 which receive the signal from a counting direction setting terminal 3 directly or via an inverter 21; two-input NOR gates 24 and 29 for receiving outputs therefrom; a two-input NOR gate 25 and a wiring 12 connected with the output sides of these two-input NOR gates 24 and 29, respectively; exclusive-OR (EX-OR) gates 26 and 30; two D-type flip/flops (hereinafter referred to as "D-F/F"s) 35 and 36; and a T-type flip/flop (hereinafter referred to as "T-F/F") 37. On the other hand, the decoder circuit 2 is composed of an EX-OR gate 38, an inverter 39, a NAND gate 40, three-input NOR gates 41~44 and two-input NOR gates 45~48. The counting direction setting terminal 3 which is one of the input terminals of the up-down counter circuit 1A in the conventional track circuit 52 serves to set the direction for counting the counter 1A. The up-down counter 1A is placed in an up-counting mode with a low level (hereinafter referred to as "L") input, whereas it is placed in a down-counting mode with a high level (hereinafter referred to as "H") input. A clock pulse forwarded from the step circuit 51 is inputted to a clock terminal 4. The counter circuit 1A executes the counting operation on the basis of the clock pulse. A resetting input terminal 5 which is a reset input terminal of the counter circuit 1A serves to set an initial condition. Another input terminal, that is, an excitation system setting terminal 6 serves to set the excitation system of the stepping motor. An "H" input sets the stepping motor the one-two phase excitation system, whereas an "L" input set the two-phase excitation system. On the other hand, output terminals 7~10 are four phase outputs (hereinafter referred to as "excitation output"s) for exciting the stepping motor 55. These excitation output signals can be obtained by decoding the signals from the counter circuit 1A. The output terminals 7, 8, 9 and 10 output the first-, the second-, the third- and the fourth-phase output in their order.

Now, referring to FIGS. 3A and 3B, an explanation will be given on the relation between the inputs and outputs in the conventional track circuit 52, i.e., the relationship between the inputs to the counting direction setting terminal 3, the clock terminal 4, the resetting terminal 5 and the excitation system setting terminal 6 and the outputs from the NOR gate 29 and the excitation outputs.

Figure 3A:
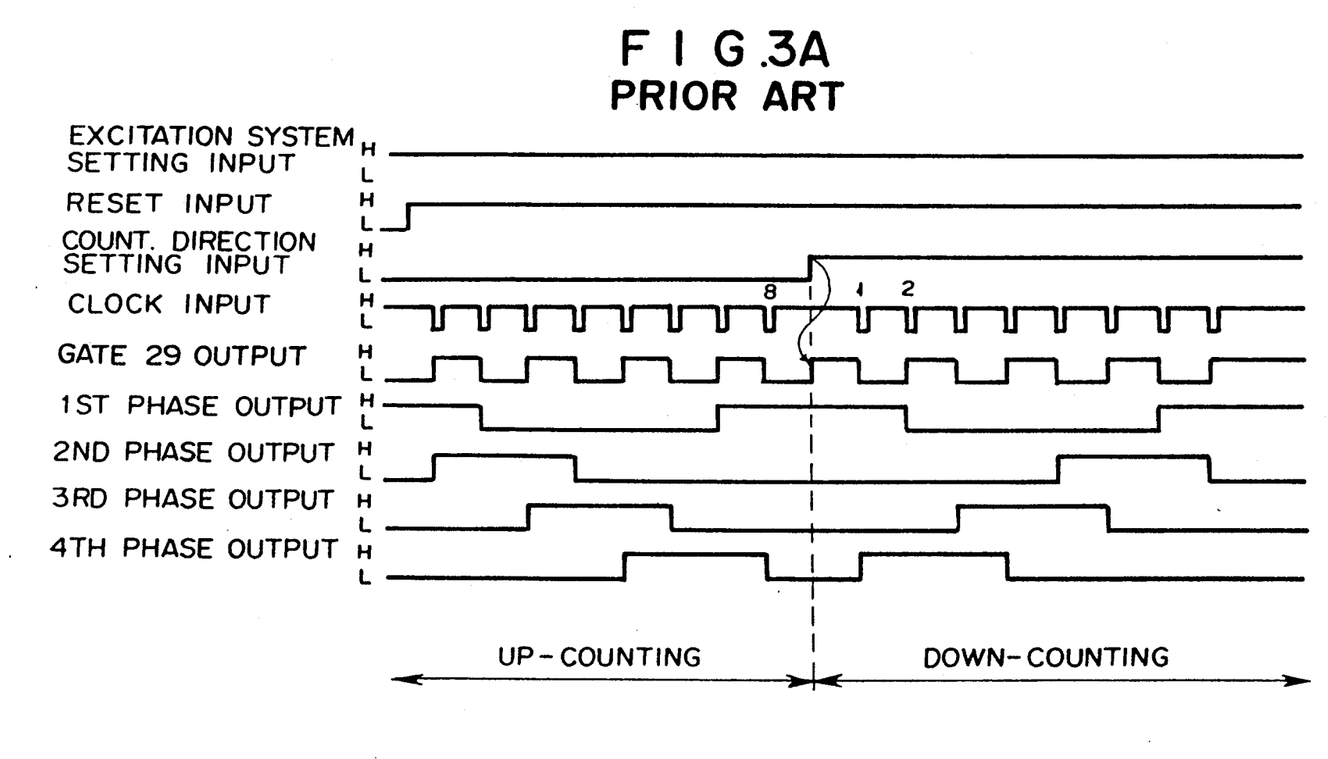
FIGS. 3A and 3B are timing charts showing the inputs/outputs relations when a one-two phase excitation system and a two-phase excitation system are set in the circuit shown in FIG. 2.

FIG. 3A is a timing chart when the one-two phase excitation system is set in the circuit of FIG. 2. As seen from FIG. 3A, if the excitation system setting terminal 6 is set for "H" to set the one-two phase excitation system for the stepping motor, and the counting direction setting terminal 3 is set for "L" to place the counter circuit 1A in the up-counting mode, the first-phase output is "H", the second- to fourth-outputs are all "L" in a reset state. Subsequently, when the first clock is inputted, the second-phase output changes into "H", so that the excitation outputs will start to change at the timing of the first clock input. Further, in response to each input clock, the state of the excitation outputs will change in sequence. If, after the eighth clock has been inputted, the counting direction setting terminal 3 is set for "H" to place the counter circuit in the down-counting mode and the first clock is inputted thereafter, the fourth-phase output becomes "H" and thus the excitation outputs start to change from the timing of the first clock input, so that the state of the excitation outputs will change in the direction reverse to that in the up-counting mode.

Figure 3B:
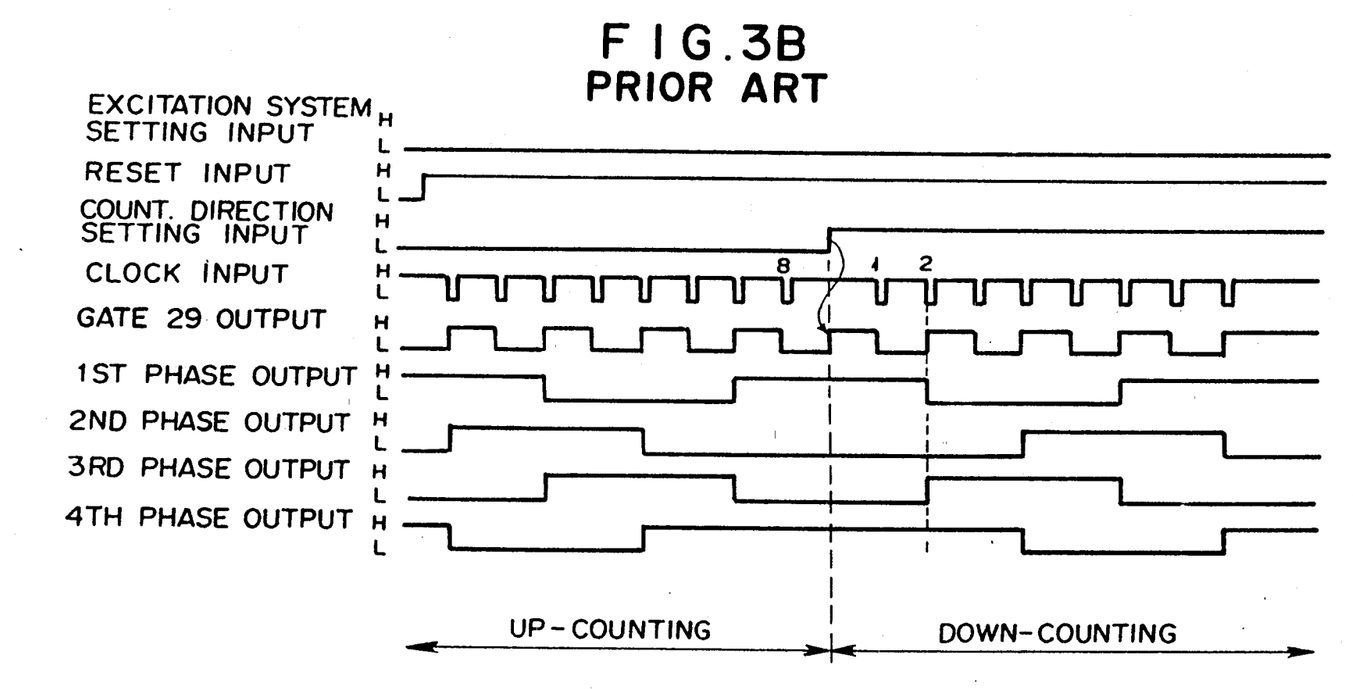

Next, FIG. 3B is a timing chart when the two-phase excitation system is set in the circuit of FIG. 2. As seen from FIG. 3B, if the excitation system setting terminal 6 is set for "L" to set the two-phase excitation system for the stepping motor 55, and the counting direction setting terminal 3 is set for "L" to place the counter circuit 1A in the up-counting mode, the first- and fourth-phase outputs are "H" and the second- and third-outputs are "L" in the reset-state. Subsequently, when the first clock is inputted, the second-phase output changes into "H" and the fourth-output is changed into "L", so that the excitation outputs will start to change at the timing of the first clock input. Further, in response to every other input clock, the state of the excitation outputs will change in sequence.

Further, after the eighth clock has been inputted, if the counting direction setting terminal 3 is set for "H" to place the counter circuit 1A in the down-counting mode, the first clock inputted thereafter does not change the excitation outputs, but in response to the second clock input, the first-phase output becomes "H" and the third-phase output becomes "H" and the excitation outputs thus start to change from the timing of the second clock input. Further, in response to every other input clock, the state of the excitation outputs will change in the direction reverse to the case of the up-counting mode.

As understood from the above explanation, the conventional stepping motor control circuit has the following problems. If the two-phase excitation system is selected, the track circuit starts the output changing operation at the timing of the second clock pulse input in either one of the up-counting operation or the down-counting operation. Thus, in comparison to the other of the counting operations, there occurs a time lag in the excitation outputs corresponding to one clock interval, i.e., a half step interval. This reduces the operation speed of the track circuit. The problem may not be limited only to the reduction of the operation speed since, in a case where information on completion of the track operation is to be sent back to the host computer which provides the stepping pulse to the stepping motor control circuit, there will be a delay in sending the information thereby causing further problems.

SUMMARY OF THE INVENTION

It is, therefore, a primary object of the invention to overcome the problems in the conventional stepping motor control circuit and to provide an improved stepping motor control circuit which can improve the operation speed of the track circuit and send the information of operation completion to the host device at a high speed.

In order to attain the above object, in accordance with the present invention, there is provided a stepping motor control circuit for controlling a stepping motor according to a stepping pulse sent from a host device, the circuit comprises:

a step circuit for generating a control clock pulse based on the stepping pulse from the host device;

a track circuit composed of an up-down counter circuit for counting the control clock pulse from the step circuit and a decoder circuit for decoding the outputs from the counter circuit into excitation outputs, and capable of setting a two-phase excitation system and a one-two phase excitation system or a two-one phase excitation system; and an offset circuit for changing the value of carry from the first digit to the second digit between a normal rotation and a reverse rotation of the stepping motor, whereby, when the two-phase excitation system is set, the excitation outputs start to change at the input timing of the first control clock pulse for the normal rotation and the reverse rotation of the stepping motor.

BRIEF DESCRIPTION OF THE DRAWINGS

The above and other objects, features and advantages of the present invention will be apparent from the following description of preferred embodiments of the invention, with reference to the accompanying drawings, in which.

DESCRIPTION OF THE PREFERRED EMBODIMENTS

Now, referring to the drawings, an explanation will be given on the first and second embodiments of the present invention.

Figure 4:
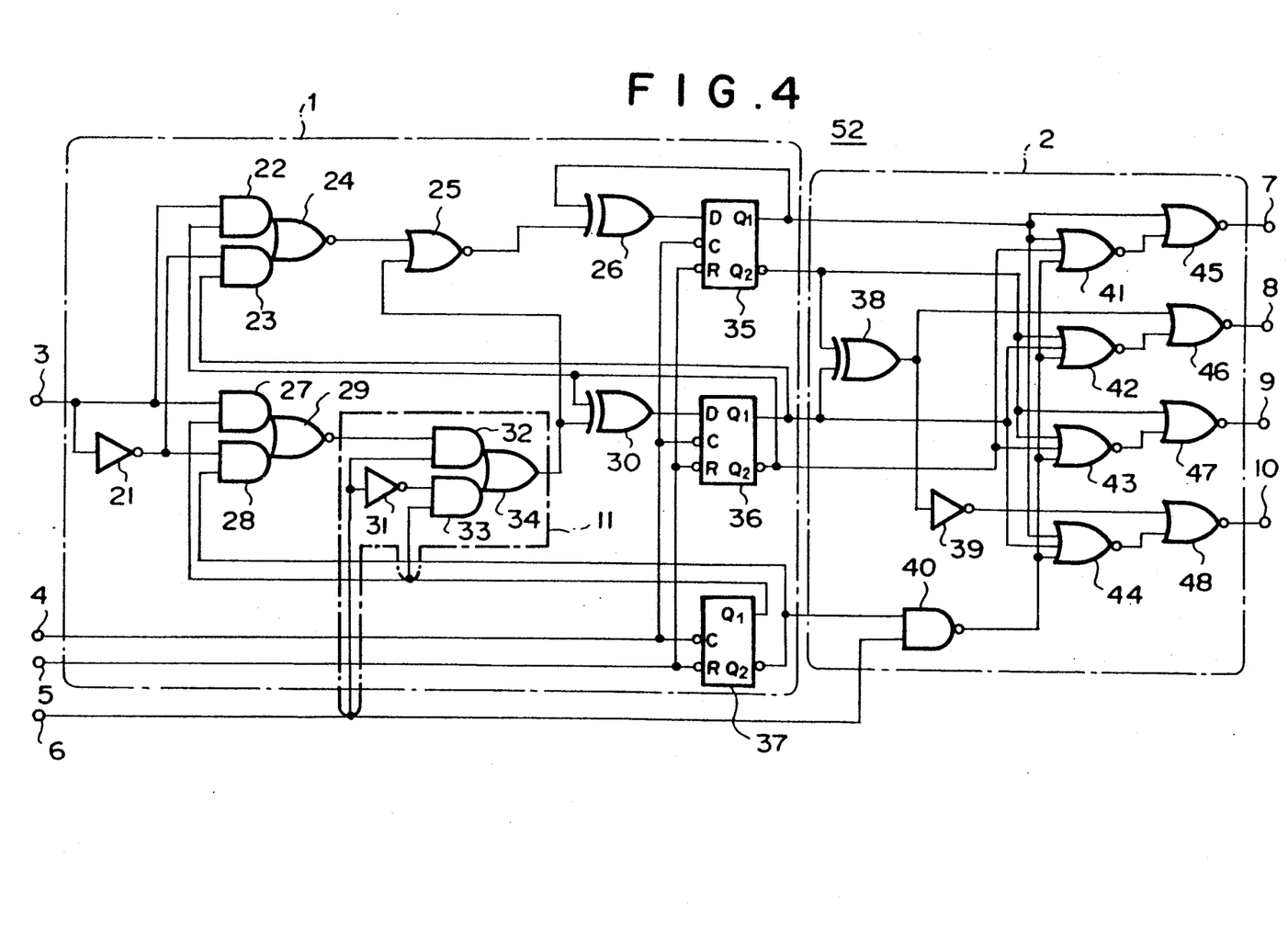
FIG. 4 is a circuit diagram of the track circuit in the stepping motor control circuit according to the first embodiment of the present invention.

FIG. 4 shows the track circuit in the stepping motor control circuit according to the first embodiment of the present invention. In FIG. 4, like symbols refer to like elements in FIG. 2.

As seen from FIG. 4, in comparison to the circuits of FIGS. 1 and 2 described above, the stepping motor control circuit according to this embodiment has the same step circuit 1 and the decoder circuit 2 in the track circuit 52, but has an improved counter circuit 1. In accordance with this embodiment, an explanation will be given of the track circuit 52 which is capable of the one-two phase excitation system and the two-phase excitation system. Now it is assumed that when the one-two phase excitation system is set, in the reset state of the counter circuit 1, the first-phase output is "H" and the second- to fourth-phase outputs are all "L" and, on the other hand, when the two-phase excitation system is set, in the reset state of the counter circuit 1, the first- and the fourth-phase output are "H" and the second- and the third-phase output are "L".

First, it should be noted in this embodiment that the counter circuit 1 is additionally provided with an offset circuit 11 which is connected with the excitation system setting terminal 6 as mentioned concerning the prior art. The offset circuit 11 is formed by an inverter 31, two NAND gates 32, 33 and an OR gate 34. In the case where the two-phase excitation system is selected with the excitation setting system terminal being "L", the offset circuit 11 serves to supply a signal to the EX-OR gate 30 from the Q1 output of the T-F/F 37. Also in the case where counting direction setting terminal 3 is made "H" to place the counter circuit 1 in the down-counting mode, the offset circuit 11 serves to speed-up the carry of the first (least significant) digit to the second digit by a half period or so in terms of the output of the T-F/F 37.

Now referring to FIGS. 5A and 5B, an explanation will be given of the inputs/outputs relation in the track circuit 52, i.e., the relationship between the excitation outputs and the output from the offset circuit 11, and the inputs to the counting direction setting terminal 3, the clock terminal 4, the resetting terminal 5 and the excitation system setting terminal 6.

Figure 5A:
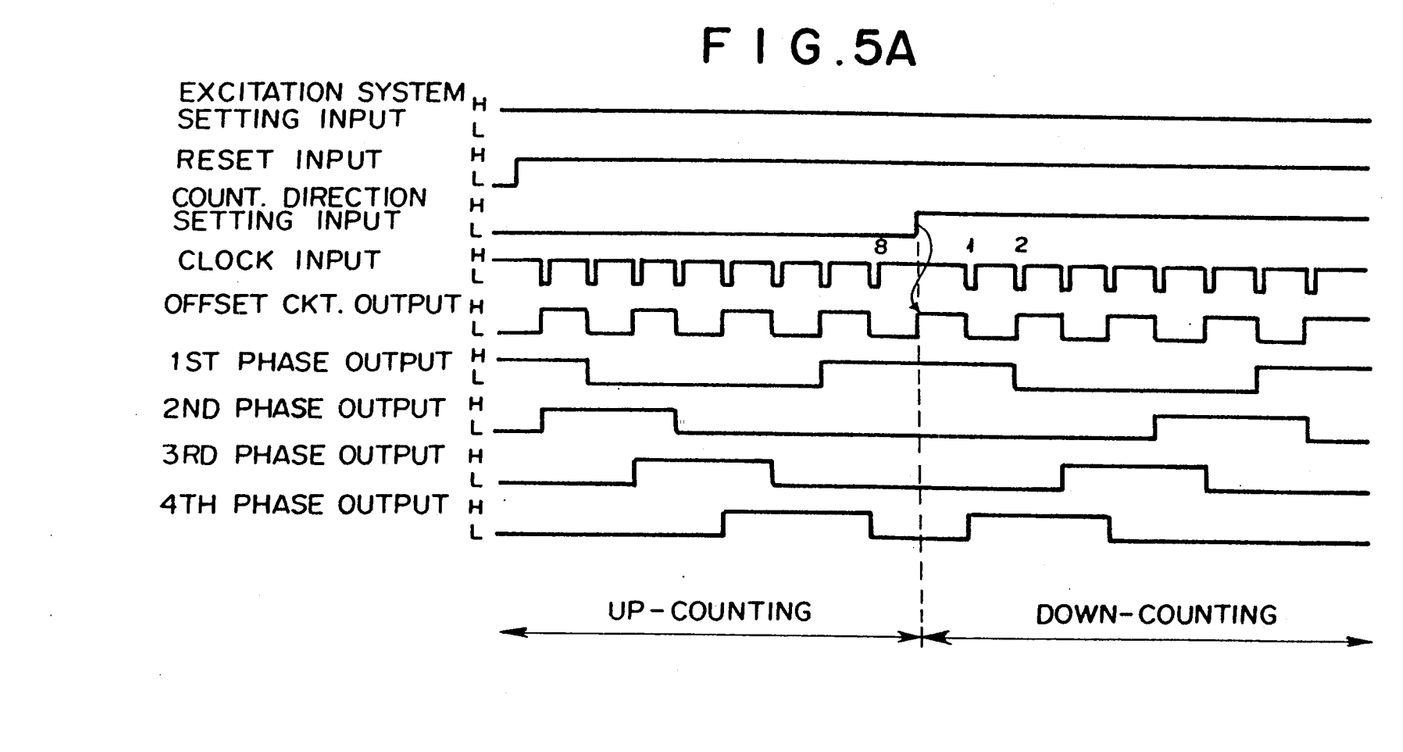
FIGS. 5A and 5B are timing charts showing the inputs/outputs relations when a one-two phase excitation system and a two-phase excitation system are set, respectively, in the circuit of FIG. 4.
Figure 5B:
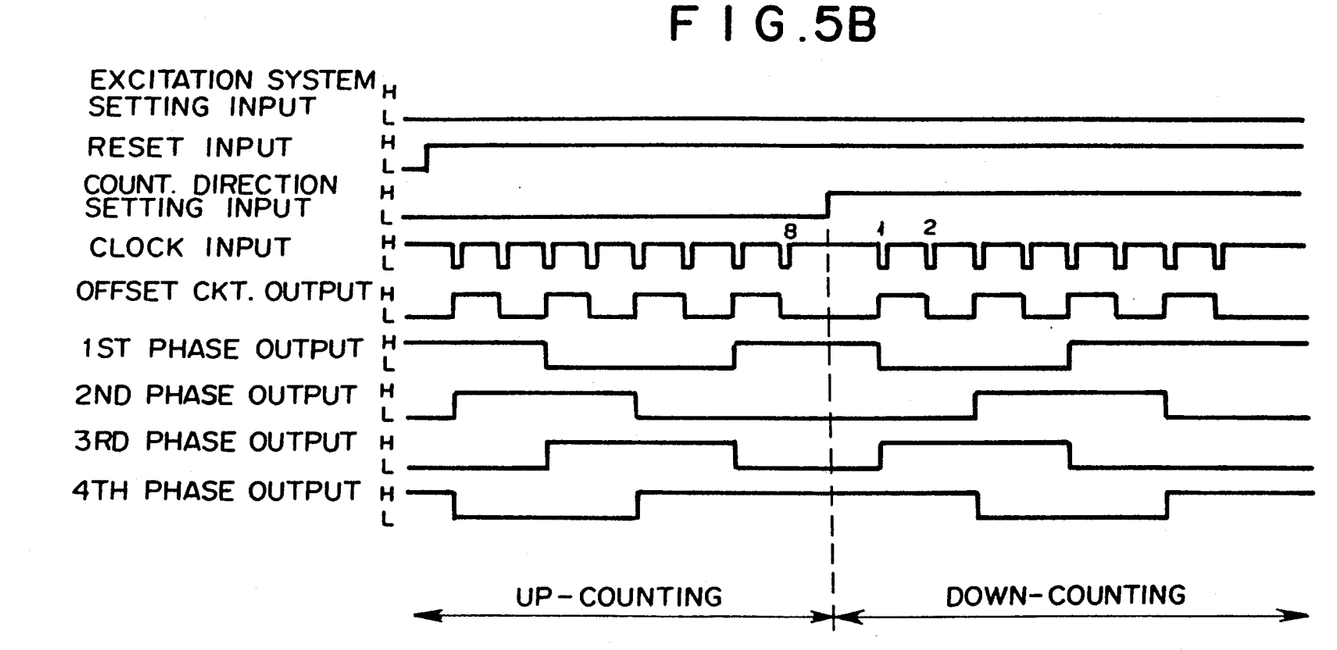

FIGS. 5A and 5B are timing charts showing the inputs/outputs relations when a one-two phase excitation system and a two-phase excitation system are set, respectively, in the circuit of FIG. 4.

As seen from FIG. 5A, if the excitation system setting terminal 6 is made "H" so as to set the one-two phase excitation system for the stepping motor, the track circuit 1 performs the same operation as the conventional track circuit 1A (FIG. 2) since the offset circuit 11 supplies the signal from the NOR gate 29 to the EX-OR gate 30. Specifically, the input from the excitation system setting terminal 6 is "H" so that the output of the AND gate 32 equals that from the NOR gate 29, and the output from the inverter 31 is "L" so that the output of the AND gate 33 is "L". Thus, the output from the OR gate 34, which equals that from the AND gate 32 and hence to the output from the NOR gate 29, is supplied to the EX-OR gate 30.

On the other hand, as seen from FIG. 5B, if the excitation system setting terminal 6 is made "L" so as to set the two-phase excitation system, the output from the offset circuit 11 is different from that from the NOR gate 29 in the conventional track circuit 1A shown in FIG. 2. Since the input from the excitation system setting terminal 6 to the AND gate 32 is "L" and the input from the inverter 31 to the AND gate 33 is "H", the output from the OR gate 34 (i.e., the output from the offset circuit 11) becomes equal to the Q1 output of the T-F/F 37.

Now, if, in this embodiment, the counting direction setting terminal 3 is made "L" so that the counter circuit 1 is placed in the up-counting mode, the output from the NOR gate 29 becomes that inverted from the Q2 output of the T-F/F 37. It equals the Q1 output of the T-F/F37, so that the inputs to the EX-OR gate 30 are the same as in the conventional track circuit 1A. However, if, in this embodiment, the counting direction setting terminal 3 is made "H" to place the counter circuit 1 in the down-counting mode, the output from the NOR gate 29 becomes that inverted from the Q1 output of the T-F/F 37. Thus the input to the EX-OR gate 30 becomes equal to the Q1 output from the T-F/F 37. This input corresponds to that inverted from the output from the NOR gate 29 in the conventional track circuit 1A. It means that the offset circuit 11 operates to speed up the carry of the first (least significant) digit to the second digit by a half period or so in terms of the output of the T-F/F 37.

In short, the entire track circuit 52 according to the present invention operates as follows, for example.

First, as seen from FIG. 5B, if the counting direction setting terminal 3 is made "L" to place the counter circuit 1 in the up-counting mode, in the reset state, the first-and the fourth-phase output are "H" and the second- and the third-phase output are "L". Subsequently, in response to the first clock input, the second-phase output changes into "H" and the fourth-phase output changes into "L". Thus, the excitation outputs start to change at the timing of the first clock pulse input and, further, in response to every other clock, pulse the state of the excitation outputs will change in sequence.

Further, if after the eighth clock pulse has been inputted, the counting direction setting terminal 3 is set for "H" to place the counter circuit 1 in the down-counting mode, in response to the first clock input thereafter, the first-phase output changes into "H" and the third-phase output changes into "H", so that the excitation outputs start to change at the timing of the first clock pulse input. Further, in response to every other input clock, pulse the state of the excitation outputs will change in the direction reverse to that of the up-counting.

Figure 6:
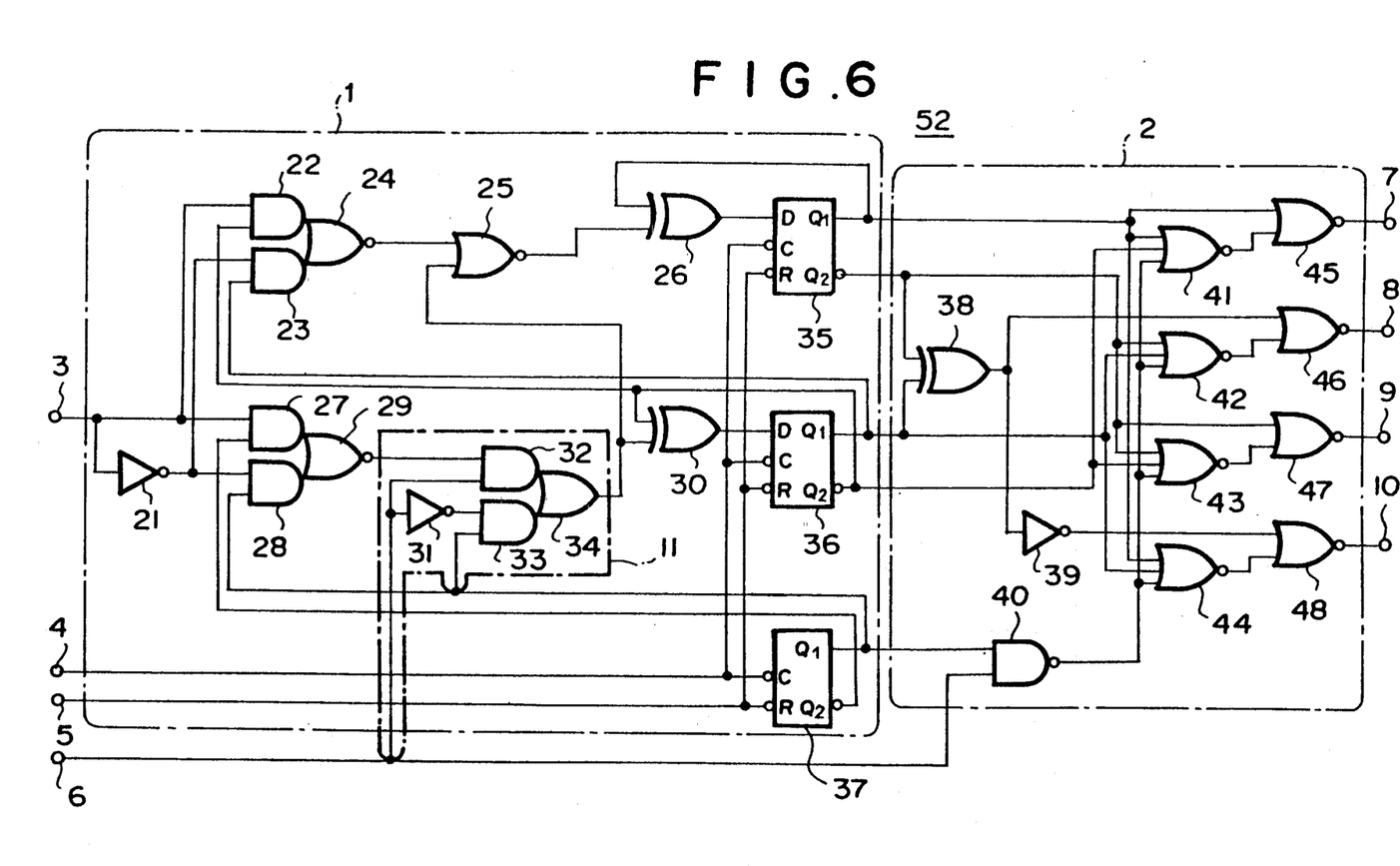
FIG. 6 is a circuit diagram of the track circuit in the stepping motor control circuit according to the second embodiment of the present invention.

FIG. 6 shows the track circuit 52 in the stepping motor control circuit according to the second embodiment of the present invention.

As seen from FIG. 6, this embodiment uses the track circuit which is capable of setting the two-one phase excitation system and the two-phase excitation system. It is assumed that with the two-one phase excitation system being selected, in the reset state of the counter circuit 1, the first- and the fourth-phase output are "H" and the second- and the third-phase output are "L", and also with the two-phase excitation system being selected, in the reset state of the counter circuit 1, the first- and the fourth-phase output are "H" and the second- and the third-phase output are "L". It should be noted that the offset circuit 11 in the counter circuit 1 in this embodiment operates only in the case where the excitation system setting terminal 6 is made "L" and the two-phase excitation system is selected. Further, with the counting direction setting terminal 3 being set for the up-counting mode, the offset circuit 11 serves to speed-up the carry of the first (least significant) digit to the second digit by a half period or so in terms of the output from the T-F/F 37.

Now, referring to FIGS. 7A and 7B, an explanation will be given on the inputs/outputs relations in the track circuit 1, i.e., the relationship between the excitation outputs and the output from the offset circuit 11, and the inputs to the counting direction setting terminal 3, the clock terminal 4, the resetting terminal 5 and the excitation system setting terminal 6.

Figure 7A:
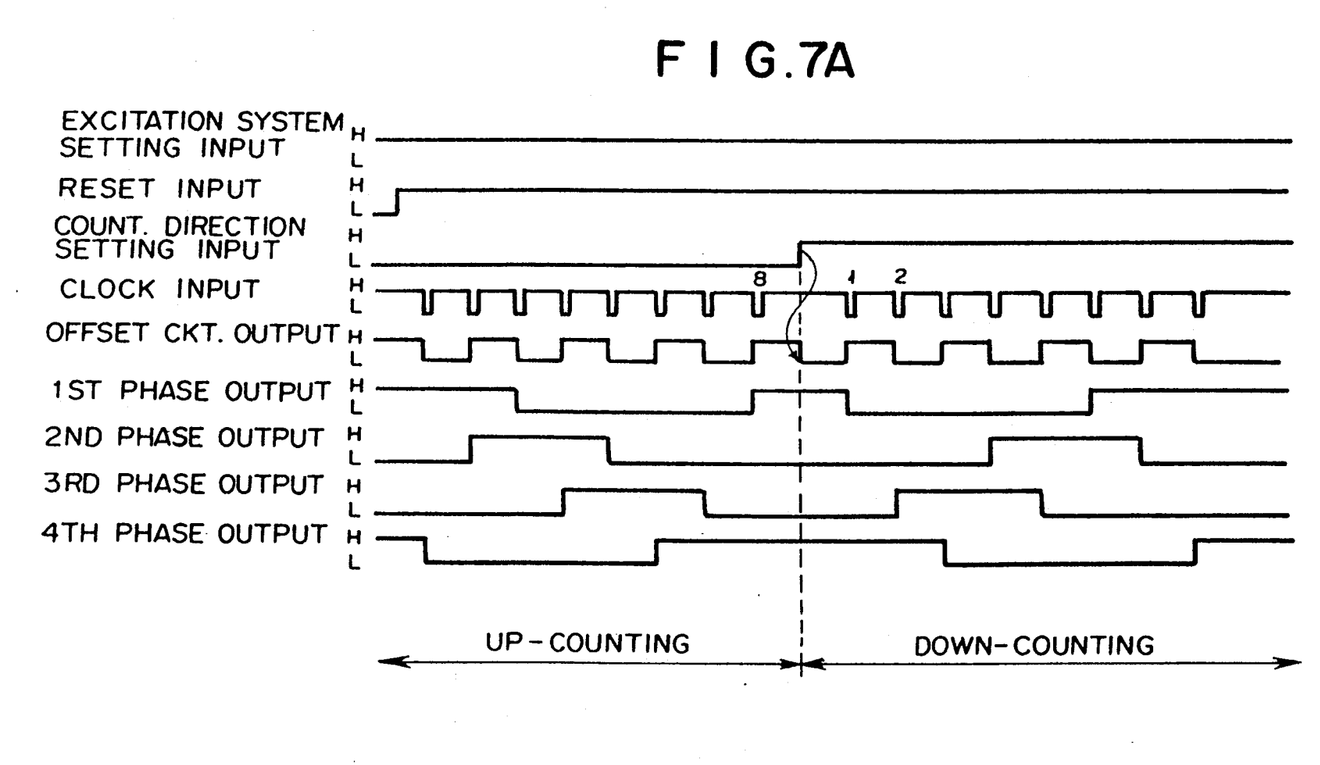
FIGS. 7A and 7B are timing charts showing the inputs/outputs relations when a two-one phase excitation system and a two-phase excitation system are set, respectively, in the circuit of FIG. 6.
Figure 7B:
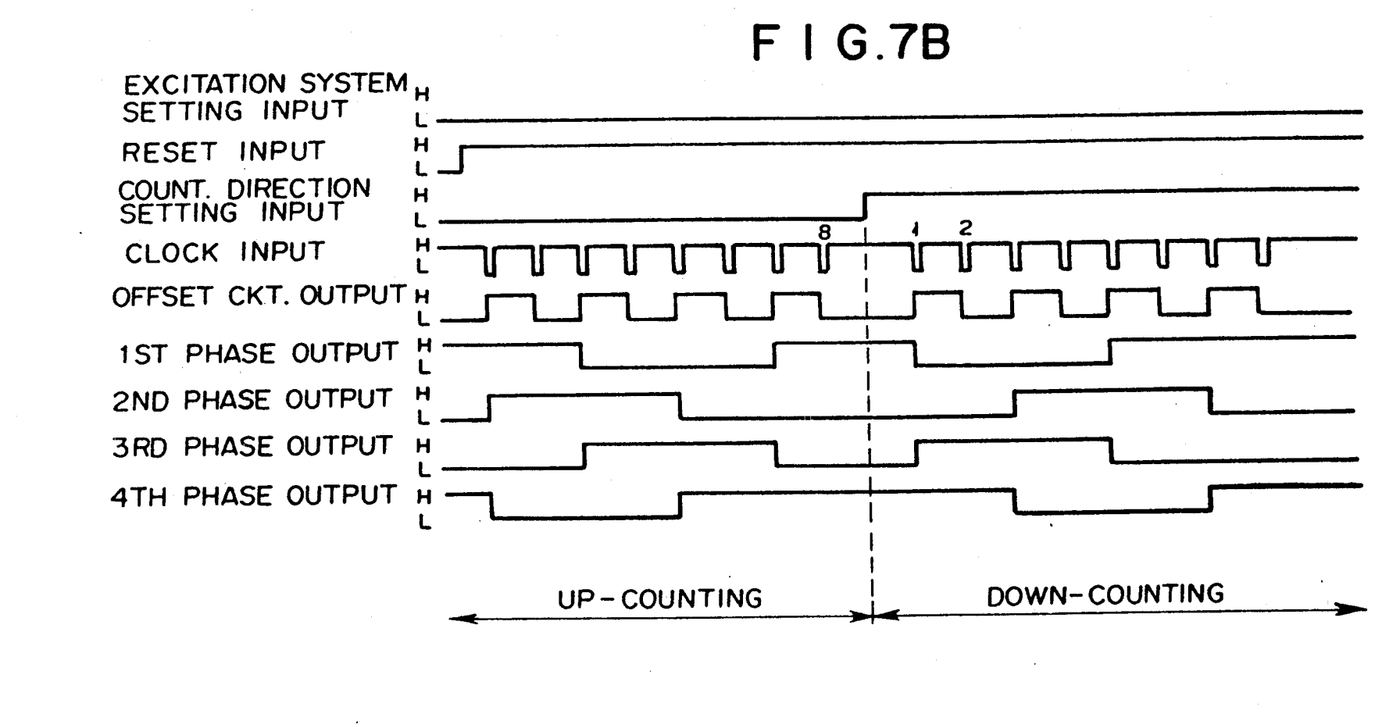

FIGS. 7A and 7B are timing charts showing the inputs/outputs relations when a two-one phase excitation system and a two-phase excitation system are set, respectively, in the circuit of FIG. 6.

As seen from FIG. 7A, with the excitation system setting terminal 6 being set for "H" and the two-one phase excitation system being selected, since the offset circuit 11 supplies the signal of the NOR gate 29 to the EX-OR gate 30, the counter circuit 1 performs the same operation as the conventional counter circuit 1A when the two-one phase excitation system is selected.

On the other hand, as seen from FIG. 7B, with the excitation system terminal 6 set for "L" and the two-phase excitation system being selected, if the counting direction setting terminal 3 is set for "L" to lead the up-counting mode, in the reset state, the first- and the fourth-phase output are "H" and the second- and the third-phase output are "L". Subsequently, when the first clock is inputted, the second-phase output changes into "H" and the fourth-phase output changes into "L", respectively, so that the excitation outputs will start to change at the timing of the first clock input. Further, in response to every other input clock, the state of the excitation outputs will change in sequence.

Further, in FIG. 7B, after the eighth clock has been inputted, if the counting direction setting terminal 3 is set for "H" to place the counter in the down-counting mode, the first-phase output changes into "L" and the third-phase output becomes "H" in response to the first clock input. Thus, the excitation outputs start to change from the timing of the first clock input. Further, in response to every other input clock, the state of the excitation outputs will change in the direction reverse to that of the up-counting mode.

As described above, the stepping motor control circuit according to the present invention is provided with an offset circuit for speeding-up the carry from the first digit to the second digit in an up-down counter, when the two-phase excitation system is selected for a stepping motor, by a half period or so in terms of the output of the first digit in up-counting or down counting. Therefore, in either case of the up-counting mode and the down-counting mode, the excitation outputs start to change at the first clock input after the counting direction has been changed. Thus, the operation speed of the control circuit can be improved and also the information on completion of the track operation can be immediately sent to a host device.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A stepping motor control circuit (50) for controlling a stepping motor according to stepping pulses sent from a host device (49), said control circuit comprising:
   a step circuit (51) for generating a control clock pulse based on said stepping pulse from said host device;
   a track circuit (52) composed of an up-down counter circuit (1) for counting said control clock pulse from said step circuit and a decoder circuit (2) for decoding the outputs from said counter circuit into excitation outputs, said track circuit being capable of setting a two-phase excitation system and a one-two phase excitation system or a two-one phase excitation system; and
   an offset circuit (11) for speeding up a changing of the carry value from a first digit to a second digit between a normal rotation and a reverse rotation of the stepping motor,
   whereby, when the two-phase excitation system is set, said excitation outputs start to change at the input timing of the first control clock pulse for the normal rotation and the reverse rotation of the stepping motor.

2. A stepping motor control circuit according to claim 1, wherein said offset circuit is controlled by a signal for setting the excitation system.

3. A stepping motor control circuit according to claim 1, wherein said offset circuit (11) provides an offset in the carry value from pulse positions of the first to the second digits only when the two-phase excitation system has been selected for the stepping motor, whereby when the two-phase excitation system has been set, said excitation outputs from said track circuit start to change at the input timing of the first control clock pulse regardless of the modes of up-counting and down-counting.

* * * * *